United States Patent [19]

Ives et al.

[11] Patent Number: 4,490,784
[45] Date of Patent: Dec. 25, 1984

[54] HIGH-SPEED DATA TRANSFER UNIT FOR DIGITAL DATA PROCESSING SYSTEM

[76] Inventors: David C. Ives, 555 Heald Rd., Carlisle, Mass. 01741; David K. Miller, 28 Albion St., Medford, Mass. 02155; Simon Steely, Jr., 20 Cortez Dr., Nashua, N.H. 03062

[21] Appl. No.: 370,506

[22] Filed: Apr. 21, 1982

[51] Int. Cl.³ ............................................. G06F 1/00
[52] U.S. Cl. ............................................. 364/200
[58] Field of Search ... 364/200 MS File, 900 MS File

[56] References Cited
U.S. PATENT DOCUMENTS
3,909,799 9/1975 Recks et al. ..................... 364/200

Primary Examiner—Raulfe B. Zache

[57] ABSTRACT

A high-speed data transfer unit that transfers data between a central processing unit in a data processing system and an external device such as a disk drive. The transfer unit has two control units, one that controls transfers with the central processing unit under control of port control commands from the processor, and the other that controls transfers with the external device under control of operational commands.

28 Claims, 18 Drawing Figures

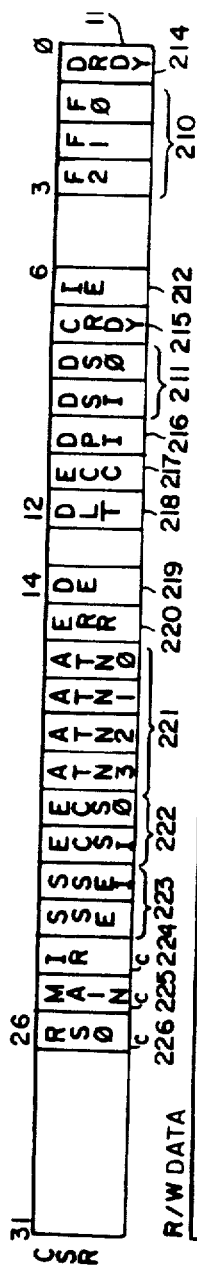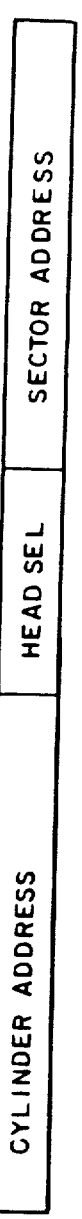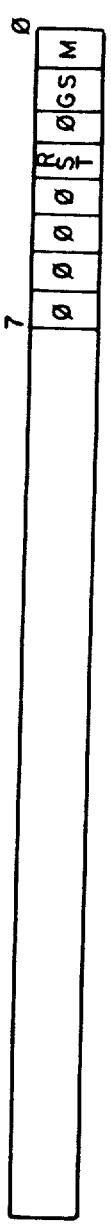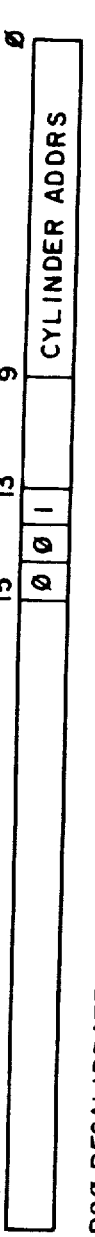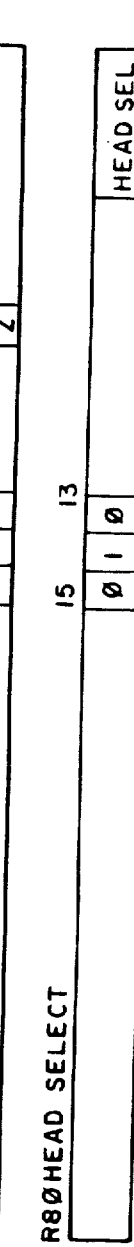
FIG.4  FIG.5  FIG.6  FIG.7  FIG.8  FIG.9  FIG.10

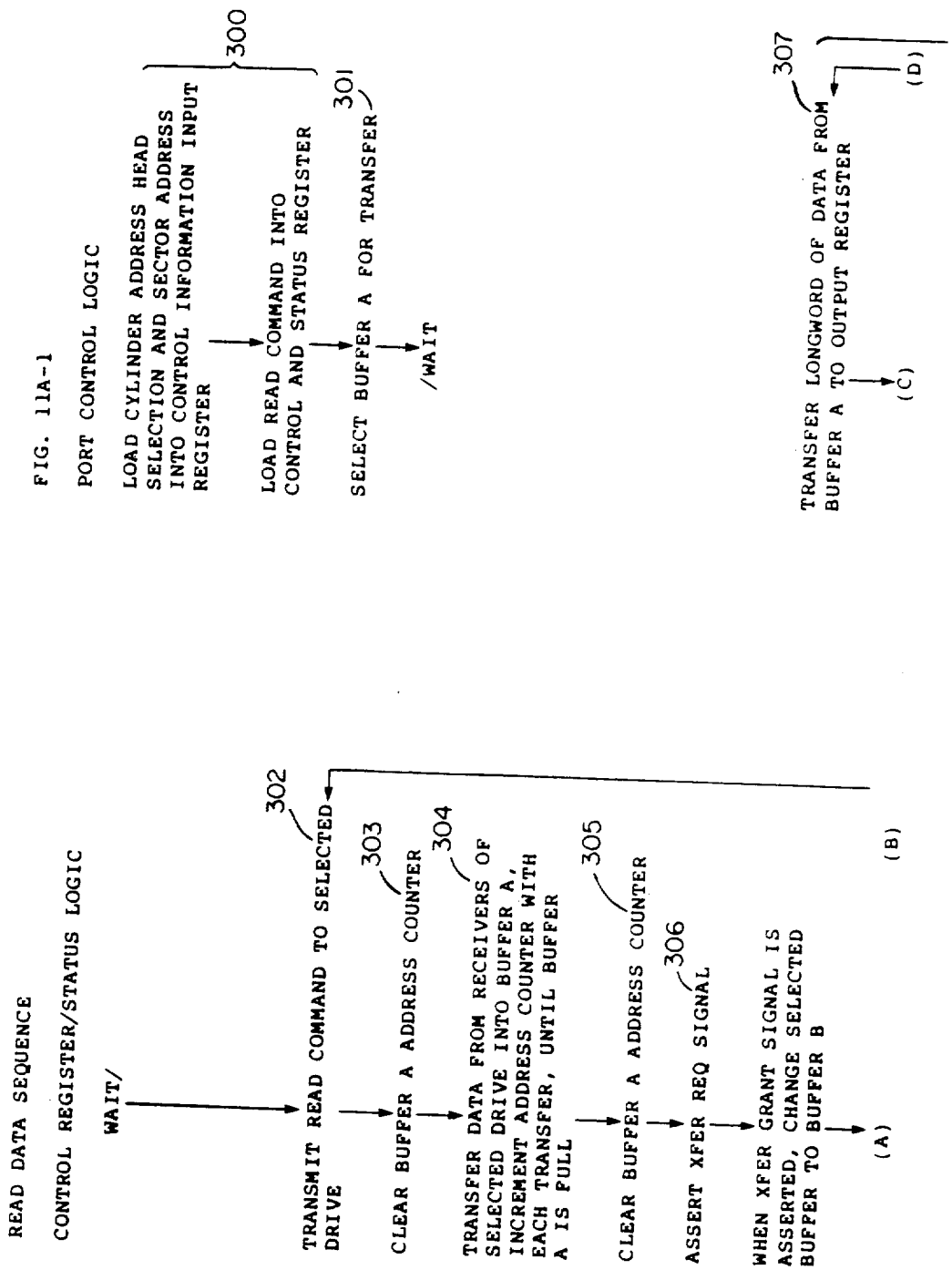

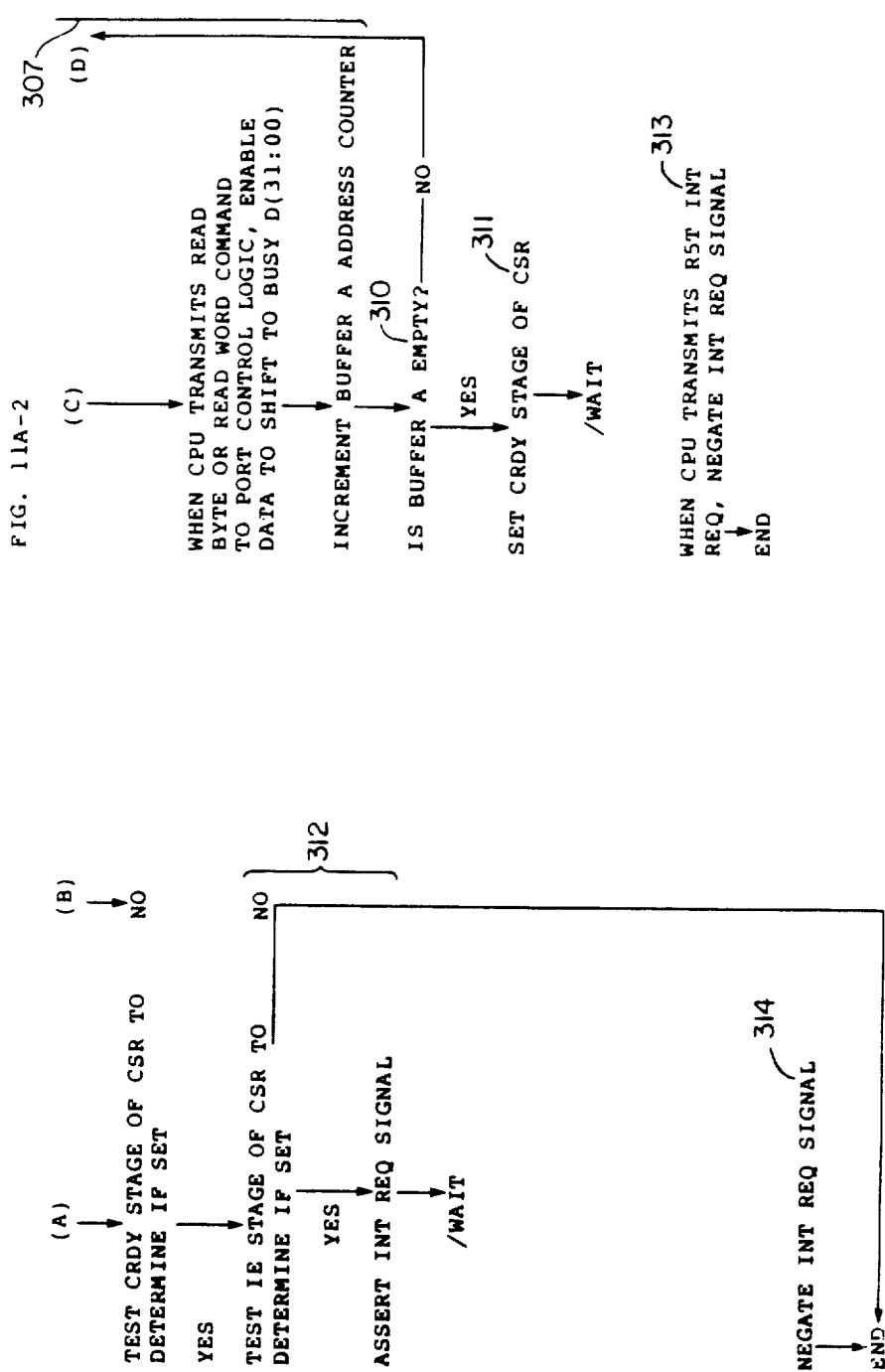

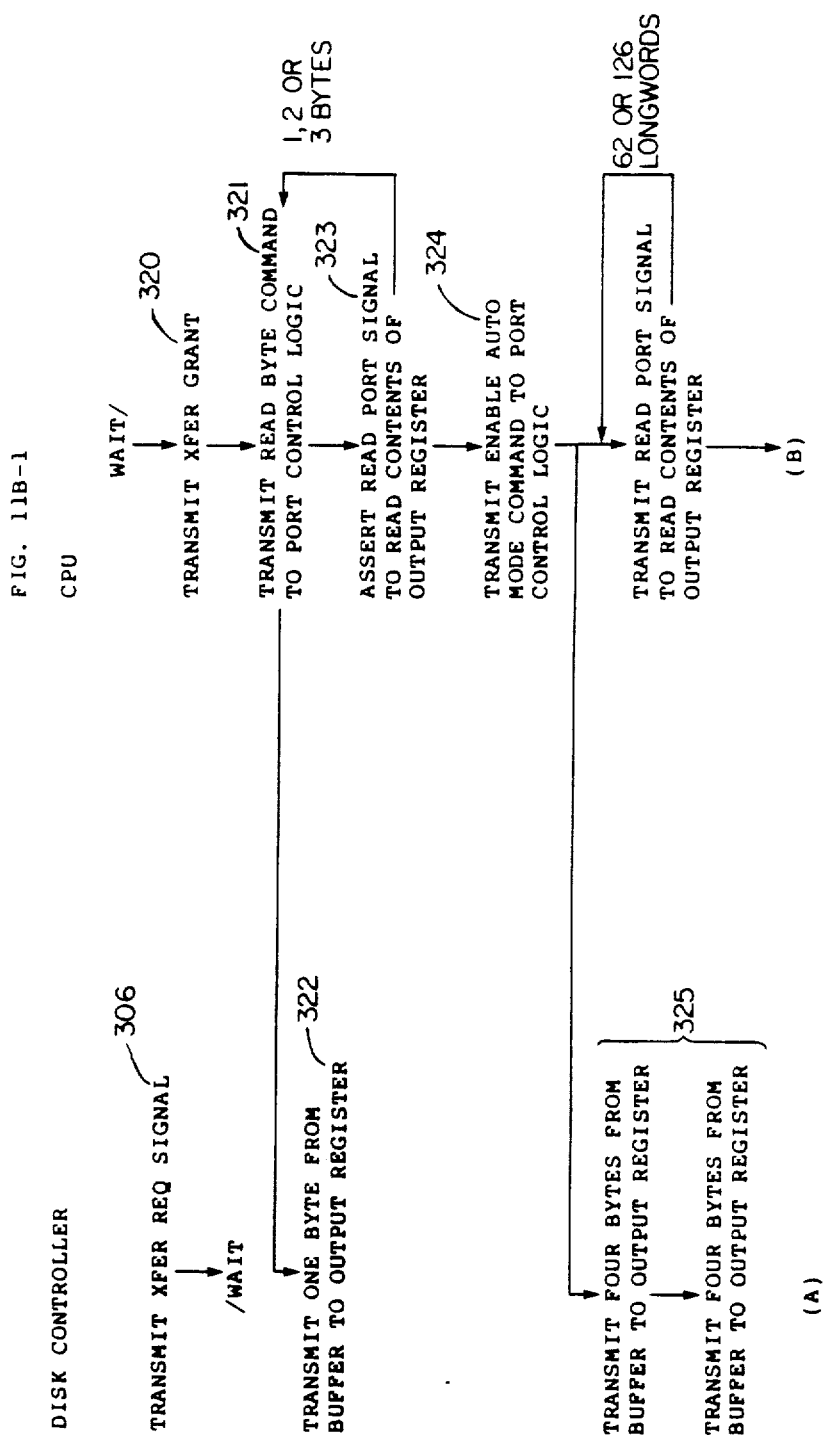

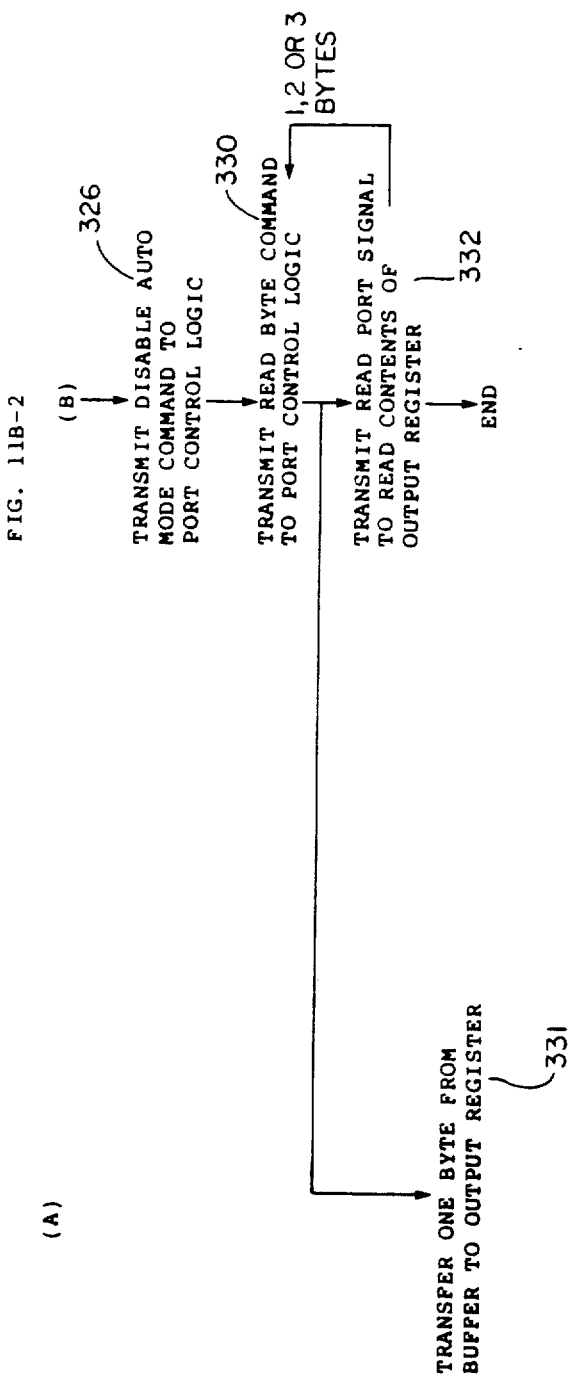

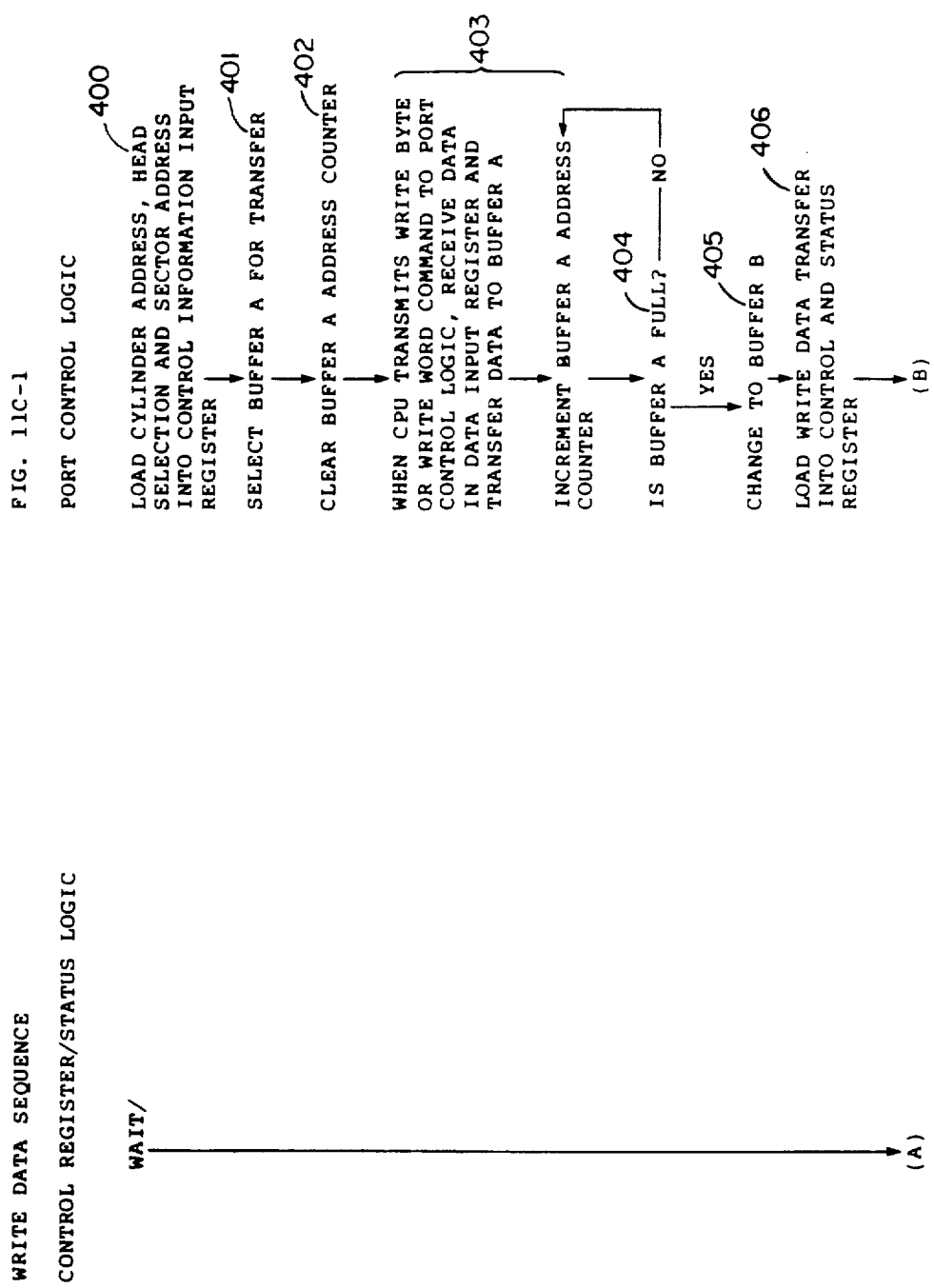

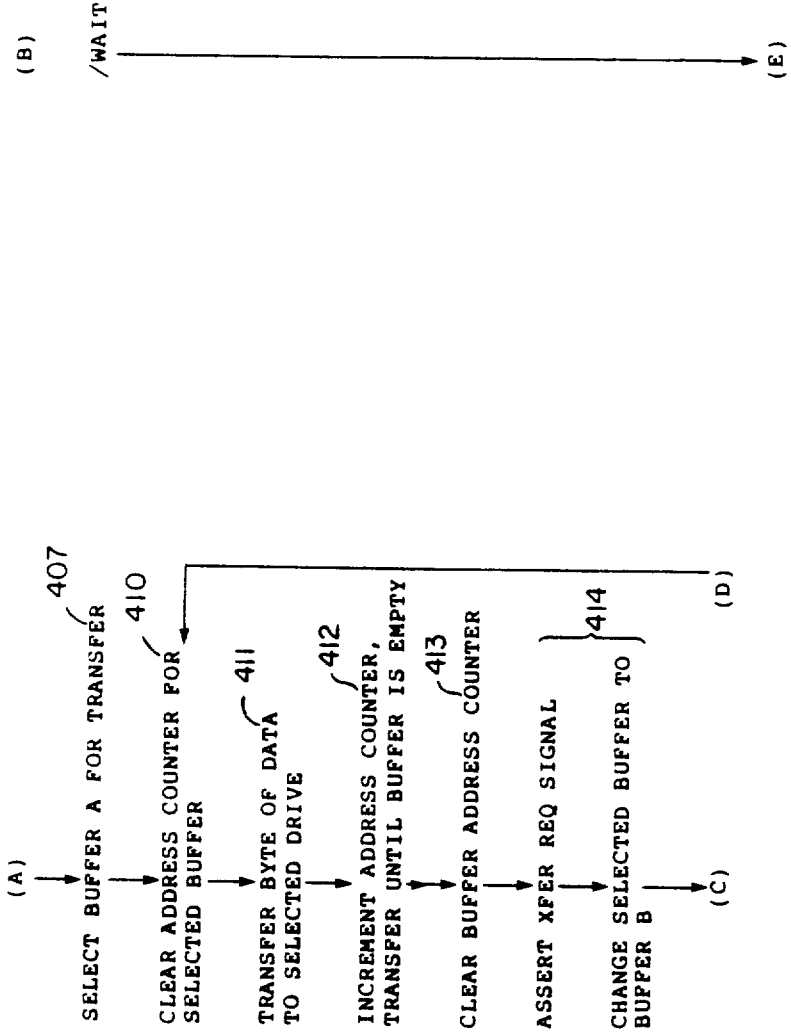

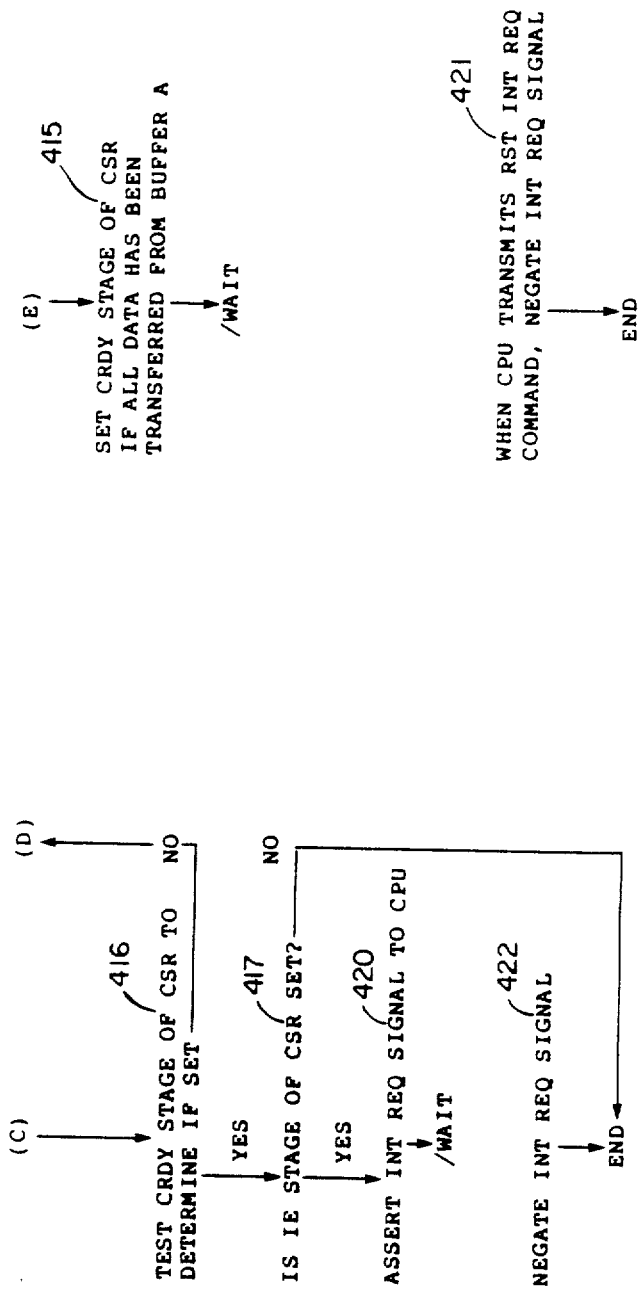

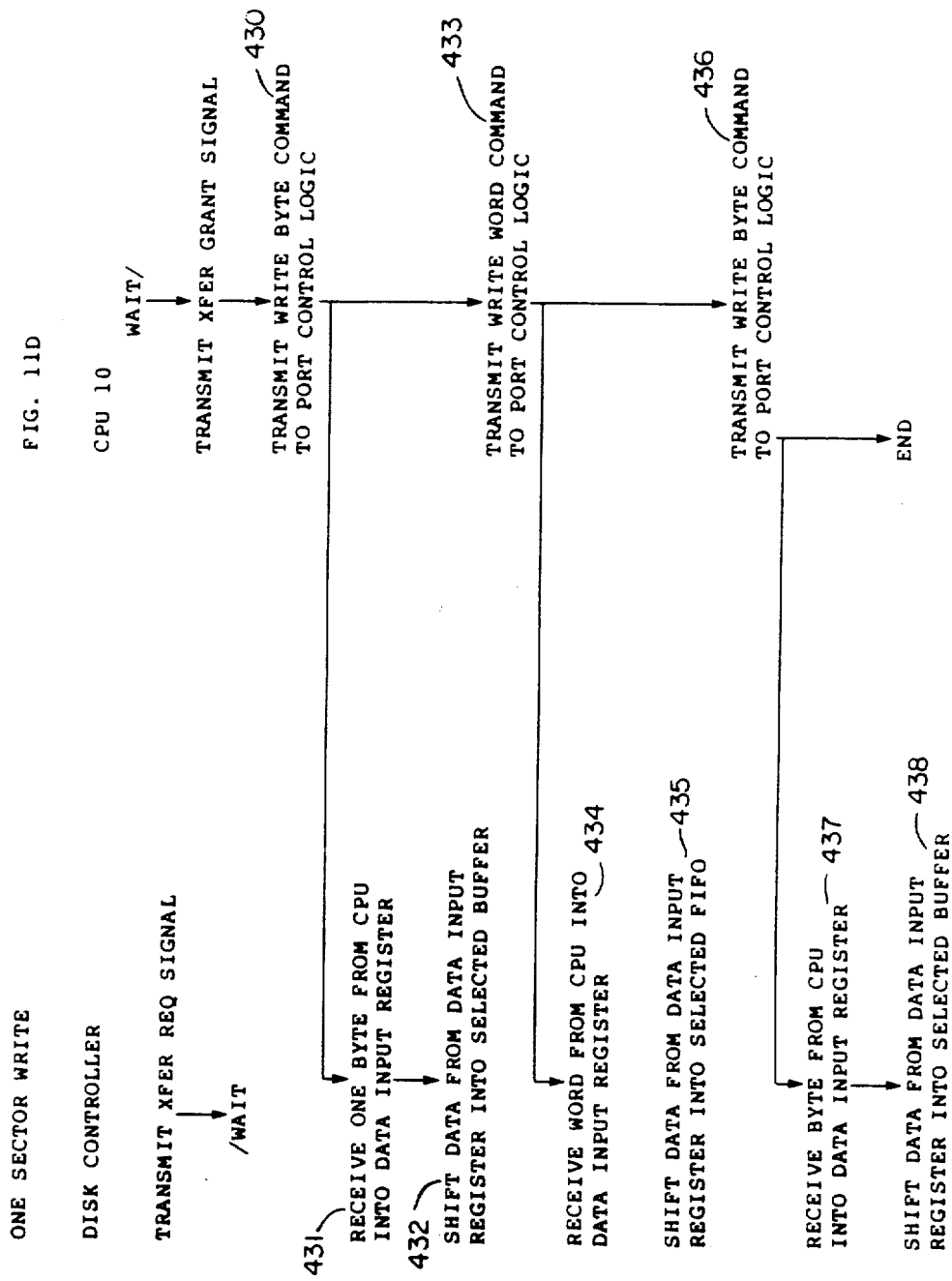

HIGH-SPEED DATA TRANSFER UNIT FOR DIGITAL DATA PROCESSING SYSTEM

BACKGROUND OF THE INVENTION

The invention relates generally to the field of data transfer devices for transferring data to and from a data processing system. The invention is specifically applicable to disk or tape controllers that transfer bursts of data to the system, and receive data, in bursts, from the system. The invention is also applicable to other transfer devices, such as would be used in scientific instruments or multiprocessing environments for transferring data rapidly between systems.

High speed data transfer units such as disk controllers normally perform a number of functions in transferring data between a data processing system and their external devices such as disk drives. The transfer unit must first connect to the system, receive commands from the system and manage transfers with the system. The transfer unit must also connect to the drive and manage transfers with the external devices. The management of transfers with the system, on the one hand, and with the external devices, on the other hand, are relatively independent.

In many prior systems, each unit that has data to be transferred to memory or that receives data from memory, is a DMA (direct memory access) device, that is, it may contact the memory itself. However, that requires substantial interfacing and control circuitry to allow the devices to engage in direct memory access. This increases the cost of the individual units and, hence, of the entire system, and it usually means that the central processing unit has reduced control over the system as a whole, as each unit is individually attempting to access memory.

Another possible arrangement is to have a number of units of the system connect directly through the central processing unit, and have it transfer data directly to or from memory. No arbitration would be needed, and the central processing unit would have more direct control over the system. Furthermore, all direct memory access functions would then be centralized in the central processing unit.

Finally, it is also desirable to simplify the programming of the data transfer unit by separating the port control commands that enable transfers between the transfer unit and the processor, and operational commands that enable transfers between the transfer unit and the external device. In the transfer unit according to the invention, the port control commands are derived from the processor's own microinstructions, while the operational commands, like data, are retrieved from memory.

SUMMARY

It is therefore an object of the invention to provide a new and improved high-speed data transfer unit.

It is a further object of the invention to provide a new data transfer unit that transfers data directly with the central processing unit, thus allowing the central processing unit to have greater control over the transfer unit.

It is yet another object to provide a new and improved high-speed data transfer unit the programming for which is simplified.

In brief, the invention provides a high-speed data transfer unit that connects directly to the central processing unit and to an external device, such as a disk drive, with which data is to be transferred. The data transfer unit includes a port control section that controls transfers between the data transfer unit and the central processing unit, on the one hand, and a separate operational control section that controls transfers between the data transfer unit and the external device, on the other hand. The port control section receives port control commands from the processor that enable data and operational commands to be received from or transmitted to the processor. The port control section enables the operational command to be received in the operational control section of the data transfer unit, or the data to be stored in or retrieved from a data buffer in the data transfer unit. This arrangement allows the programming control of the data transfer unit to be simplified, as the processor can independently control each interface of the data transfer unit, namely, the interface with the processor and the interface with the external device. Thus, as different types of external devices are developed and added, the control of the interface may be modified to accommodate the new devices, while leaving the processor interface control unchanged.

BRIEF DESCRIPTION OF THE DRAWINGS

These and other objects of the invention will be clear from the following detailed description, read in conjunction with the drawings, in which:

FIGS. 4 through 10 depict certain contents of registers in the disk controller shown in FIG. 3;

FIGS. 11A through 11D are flow diagrams that detail transfers between the data transfer unit of FIG. 3 and the central processing unit of FIG. 2.

DESCRIPTION OF AN ILLUSTRATIVE EMBODIMENT

I. General Description

A. Data Processing System

Figure 1:
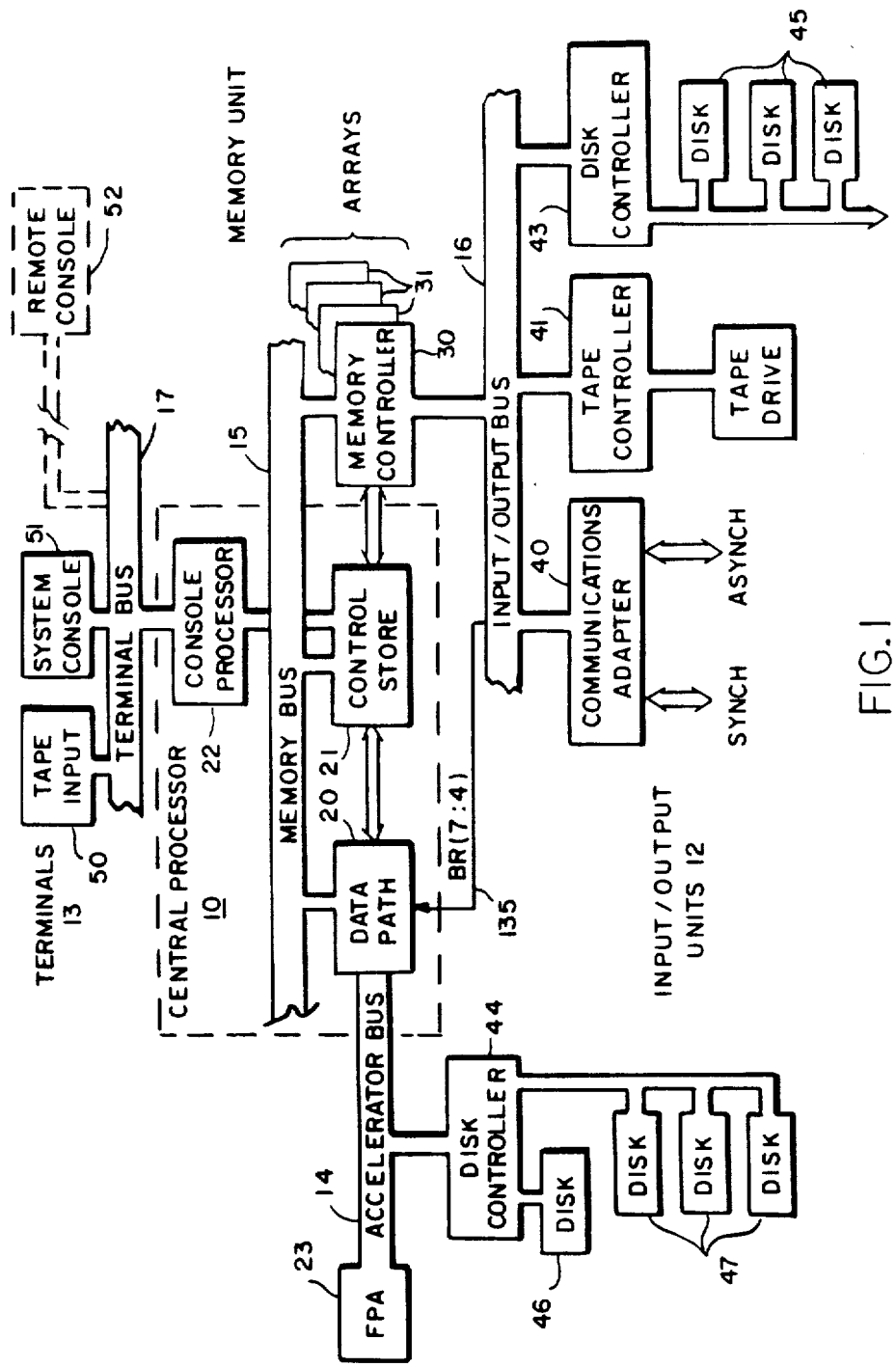
FIG. 1 is a general block diagram of a data processing system that includes a disk controller that incorporates the invention.

Referring to FIG. 1, the basic elements of a data processing system that include this invention comprise a central processor unit 10, memory unit 11, and input-/output units 12, which include terminals 13. The central processor unit communicates directly with certain of the input/output units 12 over an accelerator bus 14. The central processor unit 10 communicates with memory unit 11 over a memory bus 15, and the memory unit in turn communicates directly with others of input/output units 12 over an input/output bus 16. The central processor unit 10 communicates with terminals 13 over a terminal bus 17.

The central processor unit comprises a data processor 20, and control store 21 which are connected to memory bus 15, and a console processor 22. The console processor receives signals from terminal bus 17, and transfers them through control store 21 to data processor 20. Data processor 20 then operates on the information from console processor 22 and may transfer the information to the memory unit 11 for future processing, or it may process information directly. Similarly, data processor 20 may transfer information through control store 21 to the console processor 22, which may then transmit the information to terminal bus 17 for transfer to one of terminals 13. The data processor also performs all communications over the accelerator bus 14 with those input/output units 12 connected thereto. The communications with input/output units 12 over accelerator bus 14 are described hereinbelow.

As described below, the data path communicates directly with the memory unit 11 over memory bus 15, and indirectly with the input/output bus 16 through memory unit 11.

The control store 21 contains all of the microinstruction sequences that are used for processing the instructions that are received and executed by data processor 20, and steps through the microinstruction sequences based on sequencing information from the data processor and timing information from a timing signal generator which it maintains.

Memory unit 11 contains a memory controller 30 having one connection, or port, to memory bus 15, and a second connection to input/output bus 16. One or more memory arrays 31 connect to memory controller 30 and contain the addressable memory storage locations that may be accessed directly by the memory controller. One specific embodiment of a memory controller 30 is described in a copending U.S. patent application Ser. No. 06/370,520, filed Apr. 21, 1982.

In addition to central processor unit 10, a floating point accelerator processor 23 may be connected to accelerator bus 14. A floating point accelerator processor 23 useful in the data processing system of FIG. 1, and its connections to accelerator bus 14 are described in a copending U.S. patent application Ser. No. 06/370,390, filed on Apr. 21, 1982. Floating accelerator processor 23 receives floating point instructions from data processor 20 and is specially designed to process such instructions generally more rapidly than data processor 20 would normally be able to.

Several types of input/output units 12 are shown in FIG. 1. A communications adapter 40 can connect to synchronous and/or asynchronous data communications lines to transfer information over, for example, conventional telephone lines, or to enable connection of the data processing system as one element in a local distributed processing network. Specific signals for the synchronous and asynchronous connection to communications adapter 40 are not shown; however, such signals would depend on the particular signal protocols used in such transmission, and are not a part of this invention. The communications adapter 40 normally would include circuitry for buffering information during the synchronous or asynchronous transfers, and for generating control signals over the synchronous and asynchronous communications paths to enable the information to be transferred. The communications adapter 40 also contains circuitry for transferring information over input/output bus 16. Since the communications adapter forms no part of this invention, it will not be described further herein.

Three other input/output units 12 provide a secondary storage facility for the data processing system. They include a tape controller 41 connected to a tape drive 42, and two disk controllers 43 and 44. Disk controller 43 is connected to a plurality of disk drives 45, while disk controller 44 may be connected to a disk drive 46 and to a plurality of disk drives 47. Disk controller 44 is connected to accelerator bus 14, and is described below. Units 41 and 43, and their respective storage elements may be constructed as described in U.S. Pat. No. 3,999,163.

In one specific embodiment of the data processing system of FIG. 1, the input/output bus is constructed in accordance with U.S. Pat. No. 3,710,324, which describes in detail the signals required to transfer information thereover. These signals are only briefly described herein, and reference should be made to that patent for a detailed explanation.

Terminals 13 may include a tape drive 50 and a system console 51, which are directly connected to terminal bus 17. An optional remote console 52 may be provided to transfer signals with terminal bus 17 over telephone lines through conventional modems (not shown). The remote console 52 can be used for remote diagnosis of system failures or for remote maintenance. The tape drive 50 may be used for local maintenance or for transferring information into or out of the system. The system console may be used to provide direct operator control of the system, and may permit the operator to turn the system on or off, to initialize the system, and to step through a program sequence step-by-step.

Before proceeding further, it may be useful to establish some definitions for terms that have already been used and will be used throughout the remainder of this description.

"Information" is intelligence that controls and provides the basis for data processing. It includes address, data, control and status information.

"Data" includes information which is the object of or result of processing.

"Address" information identifies a particular storage location in which other information, such as data information, control or status information or other address information, is stored.

"Control" information identifies particular operations to be performed. It includes commands between units of a data processing system that certain operations be performed, instructions to be performed by the central processor 10 or floating point accelerator processor 23, and it also includes information that modifies a unit's performance of an operation or execution of an instruction so as to enable certain actions to occur or disable actions from occurring.

An "instruction" is a step in a program that is executed by the central processor unit 10 or floating point accelerator processor 23. Each step may be executed by the respective processor executing one or more microinstructions. Each microinstruction is stored in a specific location, which is identified as a microaddress. Other units, for example, memory controller 30 and disk controller 44, also perform operations in response to and as defined in sequences of microinstructions.

"Status" information identifies the condition of various signals generated by a unit at various times during the processing of an operation or execution of an instruction.

B. Central Processor Unit 10

Figure 2:
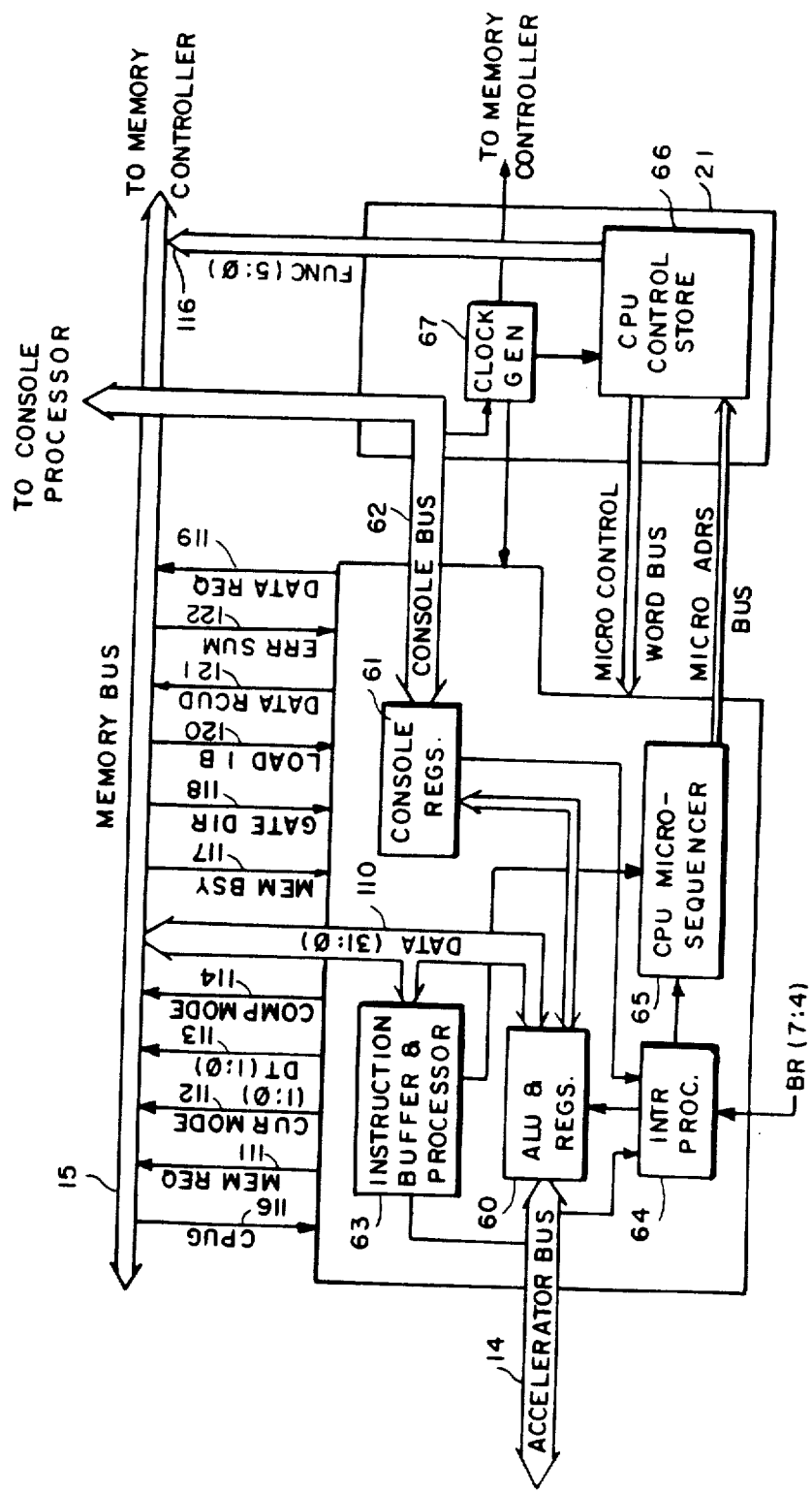
FIG. 2 is a block diagram of a central processing unit useful in the system shown in FIG. 1.

FIG. 2 illustrates, in general block diagram form, portions of central processor 10, including data processor 20 and control store 21, that may be useful in the data processing system of FIG. 1.

Data processor 20 includes a data path 60 that includes an arithmetic logic unit and a plurality of general purpose registers (not shown). In one specific embodiment of this invention, one of the general purpose registers is used as a program counter to identify the storage location containing the next instruction to be executed by the processor 10 and another register is used as a stack pointer used during the servicing of interrupts and subroutines, as described in U.S. Pat. No. 3,710,324. The data path 60 receives information from, or transfers information to, the accelerator bus 14, the memory bus 15, or from a plurality of console registers 61 that in turn receive and store information from, or transfer information to, console processor 22 over a console bus 62.

Operations performed by data path 60 are under the control of instructions stored in an instruction buffer 63 which receives each instruction fetched from memory unit 11 identified by the program counter register in data path 60. Alternatively, the operations performed by data path 60 can be controlled by an interrupt processor 64 which receives requests for interrupt service from accelerator bus 14, console bus 62 (through console registers 61) and from the input/output bus 16. The interrupt processor 64 also receives the interrupt priority level at which the processor 10 is then operating and, if the interrupt request has a higher priority, acknowledges the interrupt and causes the processor 10 to service the interrupt request. One specific embodiment of the processor 10 is microprogrammed, and a microsequencer 65 generates a microaddress that is used by a microcontrol store 66 in control store 21 to access a microinstruction depending on the instructions stored in instruction buffer 63, or the interrupt being serviced by interrupt processor 64. The microsequencer 65 generates the microaddress in response to the particular instruction in instruction buffer 63 then being processed, and the acknowledgement of an interrupt by interrupt processor 64, as well as timing signals generated by a clock generator 67 in control store 21.

C. Disk Controller 44

1. General Description

Figure 3:
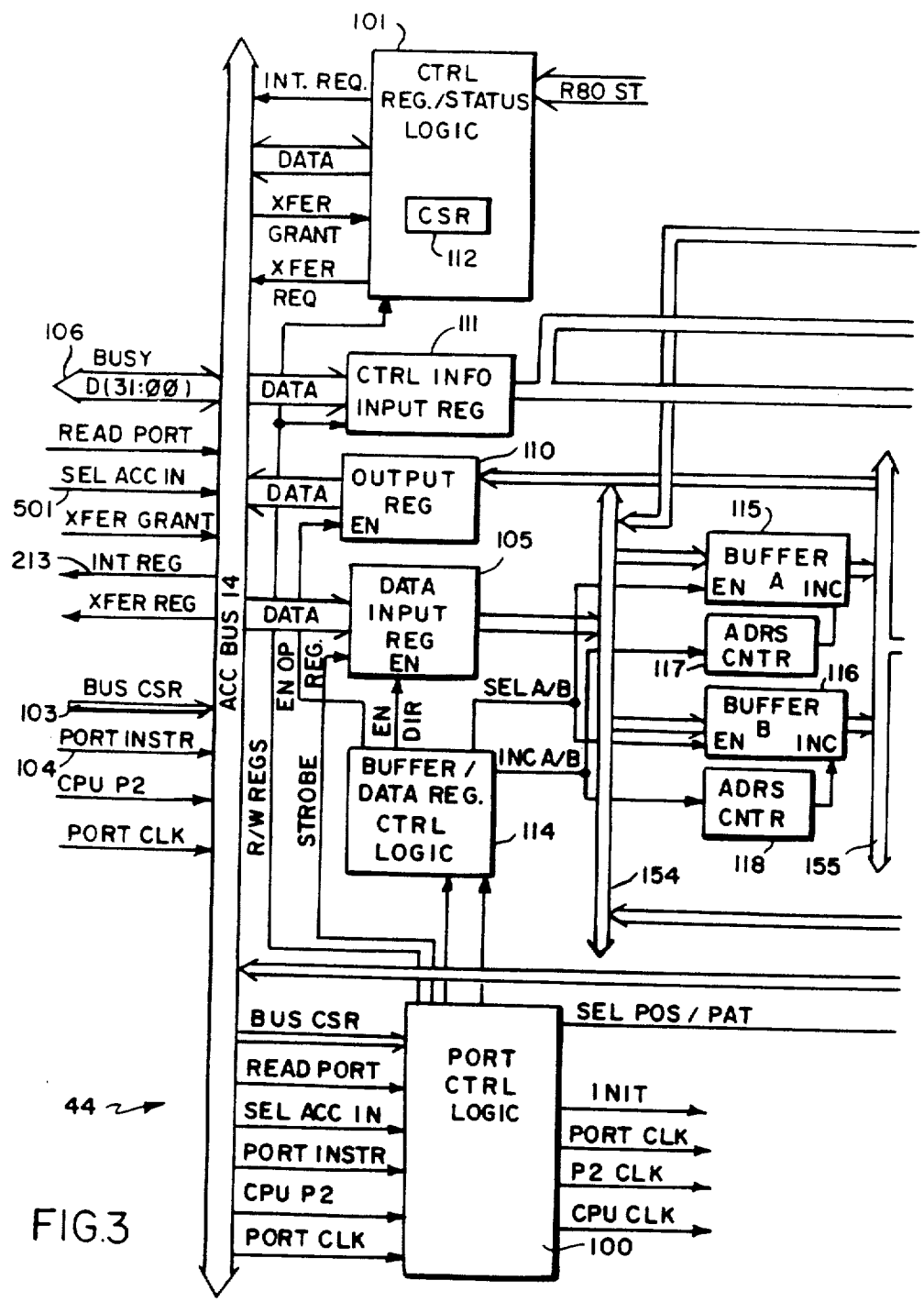
FIG. 3 is a detailed block diagram of a disk controller shown in FIG. 1 that incorporates the invention.
Figure 3:
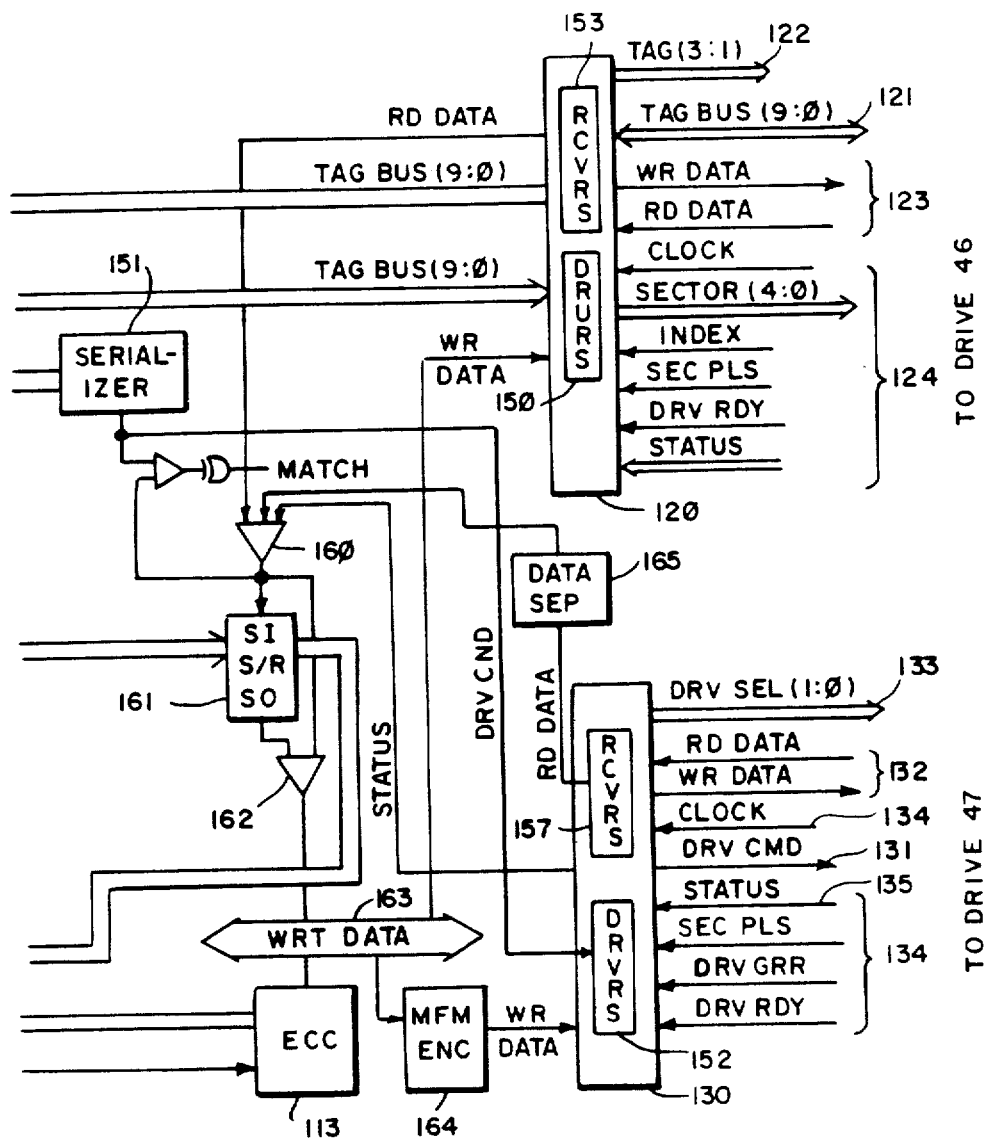

A general block diagram of disk controller 44 is shown in FIG. 3. Disk controller 44 is one specific embodiment of a high-speed data transfer unit that incorporates and operates in accordance with the invention. As shown in FIG. 3, controller 44 includes a port control logic 100 that controls the transfers of information, including data to be read from or written onto the disk of one of drives 46 or 47, and control information that controls the operation of the drives, between the disk controller 44 and central processing unit 10. A control register/status logic 101 controls the transfer of data and control information between disk control unit 44 on the one hand, and either disk drives 46 or 47, on the other hand. Port control logic 100 and control register/status logic 101 thus cooperate as described below to accomplish transfers of data between central processing unit 10 and the drives 46 and 47.

Port control logic 100 receives port control command signals over BUS CSR lines 103. In one specific system, in which processor 10 is microprogrammed, the BUS CSR signals constitute specific signals from the microword generated by processor 10's control store 66 (FIG. 2). The port control commands are thus provided by the processor 10 microinstruction. A PORT INSTR port instruction signal, which is received from processor 10 over line 104 causes the port control logic to receive the port control command signals over lines 103. The port control commands control, first, the receipt of data from a BUS Y D(31:00) 106 into a data input register 105, second, the transmission of data and status information from an output register 110 to central processing unit 10 over BUS Y D(31:00) 106, and, third, the transfer of certain information into a control information input register 111. The port control commands also control transfers from BUS Y D(31:00) into a control/status register 112 in control register/status logic 101 or from an error correction code logic 113 to transfer the error correction code information to BUS Y D(31:00). The error correction code information includes longwords that specify the position and pattern of errors, and are well known in the art. Finally, the port control commands received by port control logic 101, in conjunction with control logic 114, enable either a data buffer A 115 or a data buffer B 116 to engage in a data transfer.

Control logic 114, in addition to enabling the data buffers 115 and 116, also controls address counters 117 and 118, which cause the data to be shifted through buffer A 115 and buffer B 116. Each of data buffer A 115 and data buffer B 116 has sufficient capacity to store data from or to one entire sector from any of the drives 46 or 47, or to be transferred to any of the drives.

The drive operation commands stored in control status register 112 by central processing unit 10 identify the function to be performed by one specific drive which is identified in register 112. The control register/status logic 101, which contains and uses the contents of control and status register 112, controls the transfer of control information, as depicted in FIGS. 5 through 10, from control information input register 111 to drives 46 or 47. Logic 101 also controls the transfer of status information from the drives to output register 110 for transfer to the central processing unit 10 under control of the port control commands and port control logic 100. The control register/status logic 101 also controls the transfer of data between the drives 46 and 47 and the selected buffer A 115 or buffer B 116 and signals the processor 10 over a XFER REQ line 108, that the buffer has filled with data from the disk.

The separation of the port control commands and the operational commands allows for a number of benefits. First, it allows the programming of the two interfaces, namely the interface between the processor 10 and the disk controller 44 and the interface between disk controller 44 and drives 46 and 47, to be carried out separately. Thus, new drives can be connected and, indeed different types of devices such as scientific instruments can be connected to disk controller 44 and only the operational commands would have to be modified to accommodate new drives or instruments.

Furthermore, the fact that the controller 44 transfers data with the processor 10, rather than directly with the memory unit 11, under control of the port control commands, allows the controller to be substantially simplified. The controller 44 need not, for example, have to receive such information as the number of bytes to be transferred or the address in memory unit 11 from which or to which the data is to be transferred. Furthermore, controller 44 need not have circuitry for directly communicating with the memory unit 11. All of these functions are performed for the controller 44 by the processor 10, which allows processor 10 much greater control over the timing of transfers to and from the memory.

In one specific embodiment of the invention, drive 46 is connected to controller 44 over an interface 120 that includes a TAG BUS 121 which transfers, in parallel, control information, such as commands, to drive 46, and status information from drive 46. The interface 120 also includes transfer TAG signals over lines 122 that identify to drive 46 whether the information on TAG BUS lines 121 is control information supplied from control information input register 111, or whether drive 46 is to transmit status information to controller 44 over tag bus 121. Read/write data is transferred to drive 46 over two unidirectional serial data lines, generally identified as 123. Rounding out interface 120 is a set of lines 124 that carry control signals including clocking signals, sector pulse signals, an index signal, and various status signals. In one specific embodiment, disk drive 46 constitutes an R80 disk drive sold by Digital Equipment Corporation, assignee of this application.

In the same specific embodiment, controller 44 is connected to three of drives 47 over an interface 130. This interface comprises a serial DRV CMD drive command line 131. Controller 44 transmits operational commands through interface 130. Similarly, it transfers read/write data serially through interface 130 over a pair of unidirectional lines generally indicated at 132. DRV SEL drive select lines 133 identify the particular drive to or from which the command and data signals over lines 131 or 132 are intended. Rounding out the lines comprising interface 130 is a set of control lines 134 that transfer signals such as clocking signals, error signals and the like. In one specific embodiment, the drives 47 comprise RL02 disk drives sold by Digital Equipment Corporation.

The operational commands that are transferred from control unit 44 to drive 46 are transmitted from control information input register 111 through driver 150 of interface 120 and onto tag bus 121. The signals to be transmitted to a drive 47 are transferred first through a parallel to serial converter 151 onto a single line through drivers 152. The status signals received from drive 46 are transferred through receivers 153 and onto a common data bus 154. The status signals are shifted through either of data buffer A 115 or data buffer B 116, as selected by port control logic 100, and onto a common bus 155 for transfer to output register 110, and from there onto the BUS Y D(31:00) lines 106.

The status information signals from drives 47, on the other hand, are received through receivers 157 in serial form from a STATUS line in lines 134. They are coupled through a summer 160 to an SI shift-in input terminal of a shift register 161 that converts the serial data to parallel form. Summer 160 can also receive other signals, as indicated below; however, at this time only the serial status signals from drives 47 are being received. Thus, the only signals being coupled into shift register 161 are the status signals from drive 47.

After the serial status signals from drives 47 are converted to parallel form in shift register 161, they are shifted onto bus 154, through data buffer A 115 or data buffer B 116, and onto the common data bus 155. The status signals are then transferred through output register 110 onto BUS Y D(31:00) 106.

When a READ or WRITE operational command has been transferred to a selected drive 46 or 47, the controller 44 is then in a condition to pass WRITE data to the selected drive, or to receive READ data from the selected drive. Detailed description of the READ and WRITE operations are presented below. In brief, during a WRITE operation, data is received from central processing unit 10 in the data input register 105. This operation is controlled by the port control logic, under control of port control commands from central processing unit 10. The data is transferred from data input register 105 onto bus 154 and into one of data buffer A 115 or data buffer B 116 that had been previously selected by port control logic 100 under control of a port control command. The data is shifted out of the selected buffer onto bus 155, and into shift register 161, which operates as a parallel to serial converter. The data is shifted out of the SO shift out terminal of shift register 161 and through a second summer 162 onto a WRITE DATA bus 163. For data that is to be written in drive 46, serial data is shifted through drivers 150 onto interface 120 for transfer onto the read/write data lines 123.

Alternatively, for data that is to be written onto the disks in drives 47, the data is first passed from the WRITE DATA bus 163 through an MFM encoder 164. MFM (modified frequency modulation) encoding of write data is a technique well known in the art. After being encoded, the data is transferred through drivers 152 and onto the read/write data lines 132 to the drives 47. Simultaneously, the DRV SEL drive select lines 133 are energized to identify the one of drives 47 that is the intended recipient of the write data.

Simultaneously, with the transfer of data onto the WRITE DATA bus 163, the error correction code logic 113 monitors the data and in a conventional manner generates an error correction code checkword that is serially transferred onto write data bus 163 at the end of the data transferred from the write data buffer A or B. This error correction code checkword is transferred to the drive receiving the WRITE data and recorded on the disk in a manner similar to the write data.

Similarly, READ data is received in serial form from drive 46 on one of lines 123 through interface 120. The data is transferred through receivers 153 and to summer 160. Serial READ data from drive 47 is received from one of lines 132 through receiver 157. Since the read/write data from the RL02 disk drives is received in an unseparated form, a data separator 165 is provided which separates the data into the individual digital data bits in a conventional manner. The read data is then transferred to summer 160.

The serial data from either drive 46 or one of drives 47 is transferred through summer 160 and into the shift-in input SI of shift register 160. The parallel data words from shift register 161 are then coupled to bus 154 and into one of data buffer A or data buffer B selected by port control logic 100.

As the data is being shifted into shift register 161, it is also transferred directly from summer 161 through summer 162 and onto write data bus 163, and eventually into error correction code logic 113. The error correction code logic generates a position and a pattern code that may be transferred to central processing unit 10 over BUS Y D(31:00) under control of port control logic 100.

After the READ data has been loaded into data buffer A 115 or data buffer B 116, it is shifted out onto bus 155 through output register 110, under control of port control logic 100. Port control logic 100 also controls the transfer of data from the output register 110 onto the data lines of BUS Y D(31:00) 108.

It can be seen that the controller 44 includes a port control logic 100 that controls the receipt and transmission of data to and from the central processing unit, and a second control logic, control register/status logic 101 that controls the transfer of control information and data to and from the controller 44 and drives 46 and 47.

2. Detailed Description Of Drive Operation Commands

With this background, a detailed description is now presented of the drive operation commands transferred from central processing unit 10 to control register/status logic 101.

Preliminarily, control status register 112 contains a number of stages as shown in FIG. 4. Many of the stages contain status information that can only be read by the central processor unit. The stages that can be written by the central processor unit include an F(2:0) function code field 210 that is loaded with the command that indicates the operation to be performed. The DS(1:0) stages 211 identifies the drive to perform the operation identified in the F(2:0) stages 210. These stages are also controlled by central processing unit 10. An IE interrupt enable stage 212 can be set or reset by the central processing unit to enable the control unit 44 to transmit an interrupt request on an INT REQ interrupt request line 213 (FIG. 3).

A DRDY drive ready stage 214 (FIG. 4), when set by controller 44, indicates that the drive identified in drive select stages DS(1:0) 211 has completed the operation identified in the F(2:0) function stages 210.

A CRDY controller ready stage 215 is set by the processor 10 to indicate either that the controller has completed the operational command indicated in the F(2:0) function stages 210 and is ready to accept a new operational command from, the central processing unit or to terminate a data transfer.

Control and status register 112 also contains an OPI operation incomplete stage 216, an ECC error correction code error stage 217, a DLT data late stage 218, and DE drive error stage 219, all of which indicate errors. An ERR composite error stage 220 is set by the controller 44 if an error is detected in any of stages 216-219.

Four attention stages ATTN (3:0) generally indicated at 221 can be individually set to indicate that a drive has changed status or that it has completed a corresponding SEEK operation. Each of the stages particularly identifies one of drives 46 and 47.

Stages 222 are binary encoded stages indicating information concerning the condition of the data retrieved from the storage medium. These signals indicate whether no errors were detected by the error correction code logic 113 (FIG. 3), whether a data error was sensed, whether the error was corrected, and whether the error was incorrectible.

Stages 223 indicate certain control and status information particularly relating to the R80 disk drive 46.

An IR interrupt request stage 224 is set when the controller 44 has requested interrupt service on the INT REQ interrupt request line 212 (FIG. 3).

A maintenance stage 225, which also may be set by the central processing unit 10, places the control unit in a maintenance mode.

An R80 stage 226 is set when the DS (1:0) stages 211 have identified disk drive 46.

A number of port control commands transferred from central processing unit 10 to port control logic have been described above, and several others will be described below in the description of the operation of the disk controller 44. In summary, port control commands include commands that enable the port control logic 100 to transfer information with processor 10 to or from the control and status register 112, control information input register 111 and output register 110. The port control commands also enable the port control logic 100 to transfer the error correction code position and pattern information to processor 10 and to select one of either buffer A 115 or buffer B 116 to engage in a data transfer and to read disk address register.

The operational commands loaded into control and status register enable the disk controller 44 and a selected drive to read information from or write information onto the storage media. In addition, the operational commands may cause the drive to transfer a status word to disk controller 44, or to perform a SEEK operation.

The READ, WRITE, GET STATUS and SEEK operational commands loaded into control and status register 112 may also be supplemented by a supplemental control word that is loaded into control information input register 111 to further enable or define a particular operation to be performed. Examples of such supplemental control words are set forth in FIGS. 5 through 10. For a READ and a WRITE operational command, the supplemental control word has the form depicted in FIG. 5. The word is divided into fields which identify the sector, recording head and cylinder address for the transfer. This supplemental control word is used in conjunction with data transfers to or from any of drives 46 or 47.

FIGS. 6 and 7 depict supplemental control words used only for drives 47, specifically for the aforementioned specific embodiment in which drives 47 comprise RL02 drives sold by Digital Equipment Corporation. FIG. 6 depicts a supplemental control word for a GET STATUS operational command. The supplemental control word includes a "marker" designated by an stage "M", and "get status" stage designated "GS", both of which are set, and a "reset" stage designated "RST" which may be set. The "marker" stage M is set to indicate the beginning of a new supplemental control word; the command is indicated by the bits following the "marker". As another example of a supplemental control word for this drive, FIG. 7 depicts the supplemental control word for a SEEK operational command. The marker stage M is again set. A "direction" stage of the word, designated DIR, is set or cleared to identify the direction the heads are to move. A "head select" stage, designated HS, is set or cleared to indicate which of two heads is to engage in the transfer. Finally, a field, designated DIFFERENCE, identifies the number of tracks to be moved.

FIGS. 8 through 10 depict supplemental control words used for drive 46, specifically for the aforementioned specific embodiment in which drive is the R80 disk drive, sold by Digital Equipment Corporation. No supplemental control word is required for this drive's GET STATUS operational command. FIG. 8 depicts a supplemental control word for a SEEK command. Cylinder address stages (9:0) contain the cylinder address to which the heads are to move, while stages (15:13) contain the tag signals that are transferred directly over TAG (3:1) lines 122. FIG. 9 depicts a supplemental control word for a RECALIBRATE command in which the drive's heads move to a selected index cylinder. An RTZ return to zero stage is set, and stages (15:13) contain the code that identifies the command as a RECALIBRATE command. Finally, FIG. 10 depicts the supplemental control word for a HEAD SELECT operation, which selects one of twelve heads for a future data transfer operation. The HEAD SEL head select stages identify the selected head, and stages (15:13) contain the code that indicates the command as a HEAD SELECT command.

3. Detailed Description of Operation

With the above explanation, it is now possible to describe the transfer of control information from the central processing unit 10 to drives 46 and 47. First, central processing unit 10 may transfer an appropriate supplemental control word, that is, one of FIGS. 5 through 10, into the control information input register 11. Second, central processing unit 10 then transfers, or loads, a control information transfer command into the F(2:0) function stages 210 of control and status register 112. In the same transfer, the controller identifies the drive to engage in the control information transfer by transferring the appropriate drive select code into DS(1:0) drive select stages 214. For example, if the F(2:0) function stages 210 indicate that one of drives 47 is to engage in a GET STATUS transfer, in which the drive transmits its status word to controller 44, for transfer to central processing unit 10, the central processing unit must previously have loaded a GET STATUS supplemental control word to control information input register 111. If, however, drive 46 is to engage in a GET STATUS transfer, no supplemental control word needs to be transferred.

The control register/status logic 101, when it receives the command, if a non-data transfer command, transmits the command to the selected drive 46 or the selected one of drives 47. If drive 46 is selected, the control register/status logic 111 transfers stages (9:0) of the control information input register onto TAG BUS (9:0) lines 121 and stages (15:13) onto TAG (3:1) lines 122, to drive 46. If, on the other hand, drive 47 is selected, the control register/status logic transfers the contents of control information input register 111 through serializer 151 and onto the DRV CMD drive command line 131 to drives 47. Simultaneously, the DS (1:0) stages 214 of control and status register 112 are transmitted over DRV SEL (1:0) drive select lines 133 to drives 47. All of these operations are under control of control register/status logic 101.

If a command, such as a GET STATUS command, requires a response by the selected drive, it transmits its response to the controller 44 for transfer to central processing unit 10. If, for example, the selected drive is drive 46, the response is received over STATUS BUS in bus 44 and transferred to bus 154. The information is then shifted through one of buffers A or B, onto bus 155 and into output register, for later transfer to the central processing unit under control of port control logic. Similarly, if one of the drives 47 is to respond, the information is received over a STATUS line 135 in serial form. The information signals are shifted into the SI shift in input of shift register 161. After the shift register is full, the contents, which constitute the status word of the selected drive 47, are transmitted to bus 154, through buffer A or B, onto bus 155 and into output register 110 under control of control register/status logic 101. The information stored in output register 110 is then transferred to central processing unit 10 under control of port control logic 100.

As has been mentioned, the operational commands, indicated by the command code contained in the F(2:0) stages of control and status register 112, include conventional READ, WRITE or WRITE CHECK commands, and housekeeping commands such as GET STATUS and SEEK commands. As has been indicated, the GET STATUS command causes the identified drive to transfer a status word to the disk controller 44. The SEEK command requires no status signals to be returned by the identified drive, but it does require the drive to move its recording heads an amount indicated by the supplemental control word loaded into the control information input register.

Furthermore, in one specific embodiment, drive 46 may perform three distinct SEEK operations, each enabled by a specific supplementary control word loaded into control information input register 111. If the supplementary control word is as set forth in FIG. 8, the drive 46 performs a conventional seek operation, moving its recording heads to the cylinder identified in stages (9:0) of the control information input register.

On the other hand, if the supplementary control word loaded into control information input register 111 has the pattern set forth in FIG. 9, that is, if only stage (8) is set, and stages (15:13) are as conditioned forth in FIG. 9, the drive 46 moves its recording heads to a predetermined track of the disk.

In the third type of SEEK operation performed by drive 46, the drive selects one of several recording heads for a subsequent data transfer. The selected head is identified in stages (3:0) of control information input register 111, and stages (15:13) must be conditioned as indicated in FIG. 10.

For a data transfer command, the central processing unit 10 loads the supplementary control word set forth in FIG. 5, which identifies the sector address and cylinder address of the block from or to which data is to be transferred, as well as the recording head to perform the transfer. The controller 44 may use this information in a comparison with information stored in the sector header oh the disk, to verify that the data is being transferred to or from the selected sector. The supplementary control word for the data transfer operational command is not, however, transmitted to the drive to enable the performance of the READ or WRITE operation.

A detailed description of the operations performed by controller 44 in executing a READ operation is set forth in FIGS. 11A and 11B, while FIGS. 11C and 11D set forth a detailed description of the steps performed in executing a WRITE operation. In brief, control words having the format set forth in FIGS. 5 and 4 (the latter with the F(2:0) function stages set to a code identifying the READ operation), are loaded, under the control of port control logic 100, into the control information input register 111 and control and status register 112 (step 300). The port control logic, in response to a port control command from central processing unit 10, then selects buffer A 115 (step 301) to receive the data from the disk drive identified by stages 211 (FIG. 4) of the control and status register to be engaged in the transfer.

The control register/status logic 101 transmits the READ command to the drive identified in DS(1:0) drive select stages 211 and clears the buffer A address counter 117 (steps 302 and 303). The drive transmits a sector of data into buffer A (step 304), filling buffer A. The operation of loading data into buffer A from the selected drive is controlled by control register/status logic 101. The buffer A address counter is cleared (step 305) and XFER REQ transfer request signal asserted by control register (status logic 101). This XFER REQ transfer request signal immediately interrupts the processor 10. In one specific embodiment of processor 10, the microcode, even during the execution of instructions, periodically polls for interrupt requests generated by the XFER REQ signal. When the XFER REQ transfer request signal is asserted, the processor 10, even if it is in the middle of executing an instruction, prepares to service the interrupt request, which it services in a conventional manner, and to receive the READ data from disk controller 44. The central processing unit then asserts the XFER GRANT transfer grant signal which changes the buffer that is selected to receive data from a transferring drive to buffer B 116.

To retrieve the READ data from controller 44, the central processing unit may transmit port control commands that cause the port control logic to transmit data from buffer A to output register 110, and from there to central processing unit 10 over BUS Y D(31:00) 106 (step 307). The address counter of buffer A, which was previously cleared in step 306, is incremented in every transfer of data from buffer A. A detailed description of the process by which the data is transferred to the central processing unit 10 is described in connection with FIG. 11B. Since buffer A and buffer B each are large enough to hold an entire sector of data, their respective address counters are conditioned to transmit an overflow signal when a complete sector has been loaded into or transmitted from the buffer, which signals the port control logic 100 that the transfer is complete.

After the buffer A 115 has been emptied (step 310), the CRDY controller ready stage 215 of control and status register 112 is set (step 311) by the processor 10.

When the CRDY controller ready stage 312 is set, and if the IE interrupt enable stage 211 of control and status register has previously been set by the central processing unit, the control register/status logic 101 asserts the INT REQ interrupt request signal to central processing unit 10 (step 312). The central processing unit 10 may then read the contents of the control and status register 112, or perform other housekeeping operations. Central processing unit 10 may initiate these operations by transmitting appropriate port control commands to port control logic 100. In particular, the central processing unit 10 may transmit a READ CSR port control command to port control logic 100 to retrieve contents of the control and status register. If appropriate stages of the register are set, indicating an error in the data transfer, the processor 10 can determine the ECC position or pattern by transmitting a READ POSITION or READ PATTERN port control command to port control logic 100. The port control logic then enables the control and status register, or the ECC information 113, to transmit the requested logic over BUS Y D(31:00).

Finally, the central processing unit 10 causes the INT REQ interrupt request signal to be negated by transmitting a RST INT REQ reset interrupt request port control command to port control logic 100 (step 313). The port control logic then transmits a RST INT reset interrupt signal to control register/status logic 101 (step 314), causing the INT REQ interrupt request signal to be negated thereby completing the transfer.

As was mentioned above, FIG. 11B contains a description of the process by which the central processing unit 10 and the controller 44 transfer one sector of data from buffer A 115 to central processing unit 10. When control register/status logic 101 transmits the XFER REQ transfer request signal (step 306) and central processing unit 10 responds with the XFER GRANT transfer grant signal (step 320), central processing unit 10 transmits port control commands to enable port control logic 100 to transfer the READ data to processor 10. In one specific system including a memory controller described in the aforementioned U.S. application Ser. No. 06/370,520, the memory storage locations are long-word aligned, but byte-addressable. That is, each byte of each four-word longword in memory has an individual memory address. However, memory accesses other than at longword boundaries may be delayed in memory controller 30. The processor 10 thus initially may retrieve a selected number, namely one, two or three bytes, from the controller and transfer them to memory, to ensure that subsequent transfers to memory may be of longwords at longword boundaries. At the end of the transfer, byte transfers may also be required to empty the buffer.

To retrieve individual bytes, the processor transmits a READ BYTE port control command to port control logic 100 (step 320). The port control logic 100 transfers a byte of data from buffer A to output register 110 (step 322) and onto BUS Y D(31:00) for transfer to central processing unit 10. The central processing unit transmits the READ PORT signal to retrieve the data from output register 110 (step 323). This process may be repeated up to three times, if alignment is necessary.

The central processing unit 10, after receiving any necessary alignment bytes, transmits an ENABLE AUTO MODE port control command to port control logic 100 (step 324). This port control command causes port control logic 100 to repeatedly transfer succeeding longwords, that is, four bytes of data, into output register 110. The central processing unit 10 sequentially transmits the READ PORT signal to controller 44 to retrieve successive longwords of data from output registers (step 325).

After all but the last longword of data has been transferred, the central processing unit 10 transmits a DISABLE AUTO MODE port control command to port control logic 100 to stop it from automatically transferring the last several, that is, that last one to three, bytes of data from buffer A 115 to output register 110 (step 326). The number of bytes of data remaining to be transferred depends on the number of bytes transferred prior to the transmission of the ENABLE AUTO MODE port control command. To obtain the last data bytes, the central processing unit 10 repeatedly transmits the READ BYTE port control command to port control logic 100 (step 330 each) causing a byte of data to be transferred from the buffer A 115 to the output register 110 (step 331), and the central processing unit retrieves the contents of the output register by transmitting the READ PORT signal.

The execution of a WRITE operation, in which data is transferred from the central processing unit 10 to one of the drives 46 or 47 to be stored on the recording media therein, will be described in conjunction with FIGS. 11C and 11D.

Preliminarily, the central processing unit transfers the cylinder address, head selection and sector address, in the form set forth in FIG. 5, to the control information input register (FIG. 3) (step 400).

In performing the WRITE operation, the central processing unit 10 first transfers data sufficient to fill one sector on the disk, namely, two hundred and fifty-six words in one specific embodiment, to one of the buffers, and then transfers the WRITE command to the control and status register 112 to cause the data to be written onto the disk.

For example, if the data is to be transferred from central processing unit 10 to buffer A 115 (step 3), the central processing unit transfers a SELECT port control command to port control logic 100 (step 401). The port control logic clears the address counter 117 for buffer A (step 402). The central processing unit 10 sequentially transfers a WRITE BYTE or WRITE WORD port control command to port control logic 100 to load buffer A 115. For each transfer the port control logic increments the address counter 117 (step 403). If buffer A fills (step 404), the port control logic, under control of a port control command from processor 10, switches to buffer B for future transfers from central processing unit 10 (step 405).

When buffer A is full, the central processing unit 10 transfers a WRITE CSR port control command to port control logic 100 and transfers a WRITE DATA transfer command, which includes a drive identification in DS(1:0) drive select stages 214 (FIG. 5) into control and status register 112 over BUS Y D(31:00) (step 406).

The control register/status logic 101 then transfers the data from buffer A to the drive identified in DS(1:0) drive select stages 214. The control register/status logic selects buffer A 115 for the transfer to the selected drive, and clears the address counter 117 for buffer A (steps 407 and 410). The control register/status logic sequentially transfers bytes of data from buffer A to the selected drive until the buffer is empty, incrementing the address counter for each transfer (steps 411 and 412). After buffer A is empty, control register/status logic 101 clears the buffer's address counter, asse0ts the XFER REQ transfer request signal, and changes to buffer B 116 (steps 412, 413 and 414).

At this point the processor 10 sets the CRDY controller ready stage of control and status register 112 if no more data is to be transferred (step 415). The control register/status register tests the CRDY controller ready stage (step 416) and, if it is not set, returns to step 410 to continue transfers. If the CRDY controller ready and the IE interrupt enable stages are set, the control register/status logic 101 asserts the INT REQ interrupt request signal to central processing unit 10, if enabled (step 420). The central processing unit may read the control and status register 112 to determine whether any errors occurred during the transfer. The central processing unit 10 then transfers a RST INT REQ reset interrupt request port control command to port control logic 100 (step 421), which then causes control register/status logic 101 to negate the INT REQ interrupt request signal (step 422).

FIG. 11D depicts the sequence by which the central processing unit 10 transfers data to controller 44 in a WRITE operation. The central processing unit transmits a WRITE BYTE port control command to port control logic 100 (step 430) over BUS IB(7:0) and places a byte of data on BUS Y D(31:00), if the transfer initially is from byte locations in memory 11 other than at longword boundaries, to align the transfer for subsequent longword transfers in a manner similar to that described above for a READ operation. The port control logic receives the data in data input register 105 (step 431) and transfers it into the selected buffer (step 432). This sequence may be repeated up to three times if necessary for alignment.

The central processing unit 10 then transfers a WRITE WORD command over BUS CSR to port control logic 100, and places a longword of data on BUS Y D(31:00) (step 433). The port control logic receives the data in data input register 105 (step 434) and shifts the data into the selected buffer (step 435).

In a final sequence, the central processing unit 10 transfers one to three WRITE BYTE port control commands to port control logic, if previous transfer alignment was done, each accompanied by a byte of data on BUS Y D(31:00) (step 436). The port control logic receives each byte in data input register 105 (step 437) and transfers the data to the selected buffer (step 440) to complete the receipt of a sector of data from central processing unit 10.

This invention, a high-speed data transfer unit, has been described in a particular embodiment, specifically a disk controller. It is readily apparent, however, that the invention may be used in other high-speed data transfer units, for example, in units that transfer data between central processor units in a multiprocessing system or in a distributed processing system. Furthermore, the invention may be advantageously used in scientific instruments that may require high-speed transfers to the processing system. The provision of two buffers operating in tandem, for example, allows the central processor to be receiving data from or transmitting data to one buffer, while the devices connected to the high-speed data transfer unit may be operating with the other buffer. Furthermore, providing two control sections, namely, port control logic 100 and control register/status logic 101, in the high-speed data transfer unit, greatly simplifies its operation. One control section, the port control logic, controls the operations of the interface to the central processing unit, while the other control section controls the interface to the drive, to a scientific instrument, or other data transfer unit. Since both of these control sections cooperatively control distinct portions of the data transfer unit, connection to, for example, different types of units is greatly simplified, requiring modification of only the control register/status logic to accommodate the other unit. This greatly simplifies adaptation of the data transfer unit to new devices. Furthermore, the arrangement simplifies programming, as allowing a distinct division between port control instructions to control the interface with the central processing unit 10, and operational commands and data.

4. Detailed Description of Control Logic

FIGS. 12 and 13 depict circuitry contained in port control logic 100 and control register/status logic 101, respectively. With reference to FIG. 12, the port control logic includes a decoder 500 that receives port control commands from BUS CSR lines 103, if the PORT INSTR signal is asserted. If the port control command requires a transfer to central processing unit 10, the decoder 500 is enabled by the negation of an SEL ACC IN signal on line 501 (FIGS. 12 and 3). The SEL ACC IN signal is a port arbitration signal that selects either disk controller 44 or floating point accelerator 23 (FIG. 1) to transfer over accelerator bus 14. Decoder 500 and a second decoder 502 cooperate to generate control signals that identify the port control command received on BUS CSR. Several of the control signals are latched in a latch 503 and applied, through a multiplexer 504, to a read only memory 505 which generates port control signals, in sequence, that control transfers with disk controller 44 to and from central processing unit 10. The control signals generated by memory 505 also contain NAD (3:0) next address signals, which are also coupled by multiplexer 504. The selection by multiplexer 504 of the NAD (3:0) next address signals or the signals from latch 503 is controlled by an SEL PORT MUX signal from ROM 505.

If the signals from latch 503 are selected, they may cause ROM 505 to shift to a sequence to execute the port control command.

What is claimed as new and desired to be secured by Letters Patent of the United States is:

1. A high-speed data transfer unit adapted to connect to a data processing system and an external device, said transfer unit being connected to the data processing system over an interconnection means including first transfer means for transferring port control commands and second transfer means for transferring operational commands and data, said data transfer unit comprising:
  A. port control means connected to said first transfer means for receiving port control commands for controlling the receipt of operational commands and the transfer of data over said second transfer means;
  B. operational control means connected to said port control means and said second transfer means for receiving operational commands for controlling the transfer of data with said external device; and
  C. buffer means connected to said port control means, said operational control means, the external device and the second transfer means for transferring data between the second transfer means and the external device, said buffer means being responsive to a signal from said external device for transferring data with said external device, and responsive to a signal from said port control means for transferring data with said second transfer means.

2. A data transfer unit as defined in claim 1 which said first transfer means includes means for transferring a port command code signal identifying a port control command and means for transmitting a strobing signal, said port control means including means for receiving and decoding said port command code signal in response to the receipt of said strobing signal.

3. A data transfer unit as defined in claim 2 in which said buffer means includes independently operable first and second buffers and in which one of said port command codes identifies one of said first or said second buffers to engage in a data transfer, said port control means including means for enabling the said first buffer or said second buffer identified in said port command code in response to the receipt of such a port control command.

4. A data transfer unit as defined in claim 2 further comprising error correction means for generating an error correction code in response to the detection of an error, one of said port command codes enabling said port control means to transfer said error corrction code to said second transfer means, said port control means including means connected to said error correction means for transferring said error correction code to said second transfer means.

5. A data transfer unit as defined in claim 2 in which said operational control means includes control and status register means and in which one of said port command codes enables said port control means to transfer the contents of said control and status register means to said second transfer means, said port control means including means responsive to said port command code for enabling the contents of said control and status register means to be transferred to said second transfer means.

6. A data transfer unit as defined in claim 5 in which another of said port command codes enables said port control means to load signals from said second transfer means into said control and status register means, said port control means including means responsive to said other port command code for loading said signals from said second transfer means into said control and status register means.

7. A data transfer unit as defined in claim 6 in which said control and status register means includes means for storing an operational command, and said operational control means includes means for decoding the operatinal command and for enabling said external device to execute the operational comman.

8. A data transfer unit as defined in claim 7 in which an operational command is accompanied by a supplementary control word, said data transfer unit further comprising buffer means for storing said supplementary control word, said port control means further comprising means for enabling said supplementary control word buffer means for receiving said supplementary control word from said second transfer means in response to a port command code therefor, and said operational control means includes means for transmitting said supplementary control word to said external device in response to the receipt of an operational command.

9. A data transfer unit as defined in claim 7 in which an operational command is for a data transfer with the external device, said operational control means including means connected to said buffer means and to said external device for enabling data to be transferred therebetween.

10. A data transfer unit as defined in claim 9 in which one of said operational commands causes data to be transferred from said external device to said data transfer unit, and said buffer means includes independently operable first and second buffer means, said operational control means including means for transferring data into one of said first or second buffer means and for transmitting a signal onto said transfer means in response to the buffer means being filled, and for receiving a second signal from said second transfer means, said operational control means including means for enabling the other of said first or second buffer means to receive data from said external device in response to the reciept of said second signal.

11. A data transfer unit as defined in claim 9 in which one of said operational commands causes data to be transferred to said external device from said data transfer unit, and said buffer means includes independently operable first and second buffer means, said operational control means including means for transferring data from one of said first or second buffer means and for transmitting a signal onto said second transfer unit in response to the buffer means being emptied, and for subsequently enabling the other of said first or second buffer means to transfer data to said external device.

12. A data processing system comprising:
  A. random access memory means for storing information including data and instructions;
  B. processing means connected to said memory means and including means for retrieving instructions from said memory means and means for transferring data with said memory means and for processing said data in response to microinstructions generated by a control store in said processing means; and
  C. high speed data transfer means connected to said processing means and to an external device for transferring information between said processing means and said external device in response to commands from said processing means, said data transfer means including:

1. port control means for connecting said data transfer means to said processing means for receiving from a first transfer means port control commands in the form of microinstructions from said processing means control store for controlling the receipt of operational commands and the transfer of data over a second transfer means;
2. operational control means connected to said port control means and said second transfer means for receiving operational commands for controlling the transfer of data with said external device; and
3. buffer means connected to said port control means, said operational control means, the external device and the second transfer means for transferring data between the second transfer means and the external device, said buffer means being responsive to a signal from said external device for transferring data with said external device, and responsive to a signal from said port control means for transferring data with said second transfer means.

13. A data transfer unit as defined in claim 1 in which said unit transfers data with said data processing system in words, one of said port control commands comprising a burst transfer command, said port control means including means responsive to the receipt of a burst transfer command for enabling said buffer means to transfer a burst of words of data with said data processing system.

14. A data transfer unit as defined in claim 13 in which each of the data words comprises a plurality of bytes and one of said port control commands comprises a byte transfer command, the data processing system successively transmitting a selected number of byte transfer commands before and after a burst transfer command to enable the transfer of a corresponding number of bytes with the data processing system, said port control means including means responsive to the receipt of said byte transfer command to enable said buffer means to transfer a byte of data with the data processing system.

15. A data transfer unit as defined in claim 14 in which the number of byte transfer commands transmitted before and after the transfer of the block transfer command equals the number of bytes in a word of data.

16. A data processing system as defined in claim 12 which said first transfer means includes means for transferring a port command code signal identifying a port control command and means for transmitting a strobing signal, said port control means including means for receiving and decoding said port command code signal in response to the receipt of said strobing signal.

17. A data processing system as defined in claim 16 in which said buffer means includes independently operable first and second buffers and in which one of said port command codes identifies one of said first or said second buffers to engage in a data transfer, said port control means including means for enabling the said first buffer or said second buffer identified in said port command code in response to the receipt of such a port control command.

18. A data processing system as defined in claim 16 further comprising error correction means for generating an error correction code in response to the detection of an error, one of said port command codes enabling said port control means to transfer said error corrction code to said second transfer means, said port control means, including means connected to said error correction means for transferring said error correction code to said second transfer means.

19. A data processing system as defined in claim 16 in which said operational control means includes control and status register means and in which one of said port command codes enables said port control means to transfer the contents of said control and status register means to said second transfer means, said port control means including means responsive to said port command code for enabling the contents of said control and status register means to be transferred to said second transfer means.

20. A data processing system as defined in claim 19 in which another of said port command codes enables said port control means to load signals from said second transfer means into said control and status register means, said port control means including means responsive to said other port command code for loading said signals from said second transfer means into said control and status register means.

21. A data processing system as defined in claim 20 in which said control and status register means includes means for storing an operational command, and said operational control means includes means for decoding the operatinal command and for enabling said external device to execute the operational comman.

22. A data processing system as defined in claim 21 in which an operational command is accompanied by a supplementary control word, said data transfer unit further comprising buffer means for storing said supplementary control word, said port control means further comprising means for enabling said supplementary control word buffer means for receiving said supplementary control word from said second transfer means in response to a port command code therefor, and said operational control means includes means for transmitting said supplementary control word to said external device in response to the receipt of an operational command.

23. A data processing system as defined in claim 21 in which an operational command is for a data transfer with the external device, said operational control means including means connected to said buffer means and to said external device for enabling data to be transferred therebetween.

24. A data processing system as defined in claim 23 in which one of said operational commands causes data to be transferred from said external device to said data trafsfer unit, and said buffer means includes independently operable first and second buffer means, said operational control means including means for transferring data into one of said first or second buffer means and for transmitting a signal onto said transfer means in response to the buffer means being filled, and for receiving a second signal from said second transfer means, said operational control means including means for enabling the other of said first or second buffer means to receive data from said external device in response to the reciept of said second signal.

25. A data processing system as defined in claim 23 in which one of said operational commands causes data to be transferred to said external device from said data transfer unit, and said buffer means includes independently operable first and second buffer means, said operational control means including means for transferring data from one of said first or second buffer means and for transmitting a signal onto said second transfer unit in response to the buffer means being emptied, and for subsequently enabling the other of said first or second buffer means to transfer data to said external device.

26. A data processing system as defined in claim 12 in which said unit transfers data with said data processing system in words, one of said port control commands comprising a burst transfer command, said port control means including means responsive to the receipt of a burst transfer command for enabling said buffer means to transfer a burst of words of data with said data processing system.

27. A data processing system as defined in claim 26 in which each of the data words comprises a plurality of bytes and one of said port control commands comprises a byte transfer command, the data processing system successively transmitting a selected number of byte transfer commands before and after a burst transfer command to enable the transfer of a corresponding number of bytes with the data processing system, said port control means including means responsive to the receipt of said byte transfer command to enable said buffer means to transfer a byte of data with the data processing system.

28. A data processing system as defined in claim 27 in which the number of byte transfer commands transmitted before and after the transfer of the block transfer command equals the number of bytes in a word of data.

* * * * *